United States Patent
Hou

(10) Patent No.: US 7,318,477 B2
(45) Date of Patent: Jan. 15, 2008

(54) METHOD AND COMPOSITION FOR CLEANING A WELL BORE PRIOR TO CEMENTING

(75) Inventor: Wangqi Hou, Chesterfield, VA (US)

(73) Assignee: Akzo Nobel N.V., Arnhem (NL)

( * ) Notice: Subject to any disclaimer, the term of this patent is extended or adjusted under 35 U.S.C. 154(b) by 99 days.

(21) Appl. No.: 11/125,908

(22) Filed: May 10, 2005

(65) Prior Publication Data
US 2006/0254770 A1 Nov. 16, 2006

(51) Int. Cl.
E21B 37/00 (2006.01)
(52) U.S. Cl. .................. 166/312; 166/304; 166/305.1; 507/260; 507/261
(58) Field of Classification Search .................... None
See application file for complete search history.

(56) References Cited

U.S. PATENT DOCUMENTS

| | | |
|---|---|---|
| 2,875,831 A | 3/1959 | Martin et al. |
| 3,878,895 A | 4/1975 | Wieland et al. ............. 166/294 |
| 4,588,032 A * | 5/1986 | Weigand et al. ............ 166/291 |
| 5,273,953 A | 12/1993 | Szekely et al. |
| 5,866,517 A * | 2/1999 | Carpenter et al. .......... 507/226 |
| 6,235,914 B1 * | 5/2001 | Steiger et al. .............. 554/114 |
| 2003/0006040 A1 | 1/2003 | McGregor et al. |

FOREIGN PATENT DOCUMENTS

| | | |
|---|---|---|
| EP | 0 199 131 A2 | 10/1986 |
| EP | 0243067 A2 | 10/1987 |

OTHER PUBLICATIONS

International Search Report for International Application No. PCT/EP2006/062028 dated Dec. 6, 2006.
IPER for International Application No. PCT/EP2006/062028 dated Jul. 25, 2007.

* cited by examiner

Primary Examiner—Zakiya Bates
Assistant Examiner—Angela DiTrani
(74) Attorney, Agent, or Firm—Ralph J. Mancini

(57) ABSTRACT

The invention generally relates to a spacer system for cleaning a section of a subterranean well borehole and casing prior to cementing. The spacer system of the invention comprises a at least one alkyl ether citrate and, optionally, at least one alcohol ethoxylate.

15 Claims, 1 Drawing Sheet

Cleaning Efficiency of Alkylether Citrate ($C_{10}EO_7$ sodium salt in water)/Berol 840 Formulation on Synthetic Oil Based Mud (SBM)

Figure 1 - Cleaning Efficiency of Alkylether Citrate ($C_{10}EO_7$ sodium salt in water)/Berol 840 Formulation on Synthetic Oil Based Mud (SBM)
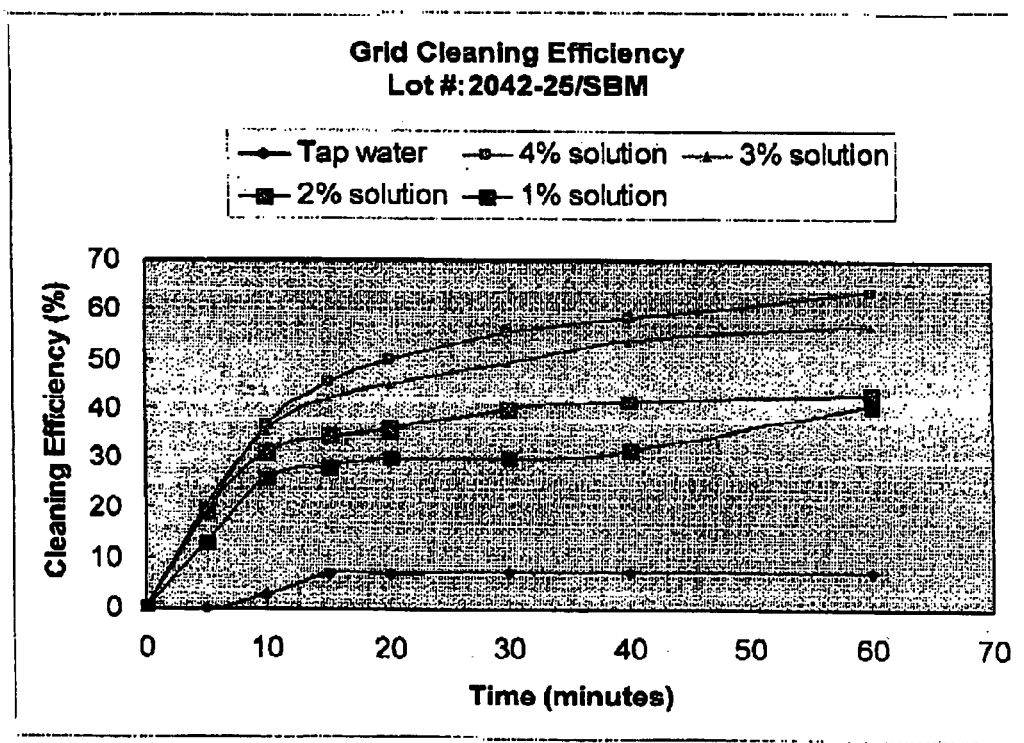

METHOD AND COMPOSITION FOR CLEANING A WELL BORE PRIOR TO CEMENTING

FIELD OF THE INVENTION

This invention relates to a composition and method for cleaning a subterranean well borehole and casing prior to cementing. A series of spacer fluids are introduced into the borehole to displace drilling fluid and to provide clean and water wet casing and borehole surfaces of the cleaned section of well bore. The cleaned section of the well bore will provide surfaces for superior bonding of the cement to the surfaces. Also the removal of all oil-based traces from the drilling mud ensures that the cement chemistry is not affected by them.

BACKGROUND OF THE INVENTION

The exploration and recovery of gas and oil requires drilling a borehole into the ground through the geological formations of interest. Drilling mud is used to lubricate and cool the drill bit, to assist in bringing the drill cuttings to the surface, to provide sufficient hydrostatic pressure within the well to prevent the bore collapsing under the forces experienced underground, and to prevent the influx of fluid from the formation while drilling. The drilling mud can be either aqueous based or oil or synthetic based.

After drilling the borehole a tubular casing is secured within the borehole with cement. This insures permanence of the borehole and prevents entry of formation fluid, other than from the formation which is being exploited. It is common procedure to pump the cement down the inside of the casing to the bottom and then up the outside of the casing, between the casing and the borehole wall, until it fills and lines the section of the annulus to be cemented. It is important that the cement lining be free of voids and the cement be well bonded to both the casing and borehole wall. If good bonding is not established between the cement, casing and borehole wall surfaces, serious problems can arise. In addition, the cement chemistry is very sensitive to oil and hydrophobic solids. The complete removal of these contaminants from the wellbore is therefore essential to a better control of the cement setting and flow properties.

To ensure good bonding between cement and the appropriate surfaces, it is necessary to remove substantially all traces of drilling mud on the casing and the borehole wall. Incomplete mud removal can leave a channel behind which could prevent total isolation of a production zone. The substantial or complete removal of drilling mud often proves extremely difficult and various methods and mechanisms have been devised in an attempt to achieve complete mud removal and to provide a complete cement lining, free of voids, between the casing and the borehole wall.

One method involves the use of spacer fluids, i.e., liquids that literally wash the mud off of the casing and borehole wall, ahead of the cement. Spacer fluids can be pumped so that they are positioned between the cement and the mud. Such fluids are sometimes referred to as "chemical washes" which are usually low-viscosity liquids containing surfactants and mud thinners, or diluents. Spacers can also be viscous, gel-like liquids that are primarily used to form a buffer between the cement and the mud. Typically, a spacer is characterized as a thickened composition that functions primarily as a fluid piston in displacing the mud. Frequently, spacers contain an appreciable amount of weighting materials, as well as fluid loss control agents. Chemical washes, on the other hand, are generally thin, or relatively non-viscous, fluids which are effective principally as a result of turbulence, dilution, and surfactant action on the mud and mud filter cake. Chemical washes may contain some solids to act as an abrasive, but the solids content is generally significantly lower than in spacers because chemical washes are typically too low in viscosity to have good solids carrying capacity.

While there are various chemical washes and spacer fluids in commercial practice today, there is a need for an improved composition and method for displacing drilling fluids and leaving the borehole surfaces clean for adequate bonding and setting of cement in the annular space defined by the casing and borehole wall.

SUMMARY OF THE INVENTION

The present invention generally relates to a composition and method of cleaning a wellbore prior to cementing operations. The composition of the invention comprises at least one alkyl ether citrate. In another embodiment, the invention relates to a combination of at least one alkyl ether citrate and at least one alcohol ethoxylate. The invention also relates to a method of cleaning a wellbore prior to cementing operations.

BRIEF DESCRIPTION OF THE DRAWINGS

FIG. 1 demonstrates the cleaning efficiency of alkylether citrate ($C_{10}EO_7$ sodium salt in water)/Berol 840 formulation on synthetic oil based mud (SBM).

DETAILED DESCRIPTION OF THE INVENTION

Drilling muds are typically classified based on the composition having a liquid phase, such as: fresh-water, salt-water, emulsion, oil, and synthetic based. Synthetic based muds are more biodegradable and more dispersible in seawater or brine, than traditional oil based muds; however, they are more difficult to remove from the metal surfaces of drilling equipment.

Drilling muds normally consists of liquid (water, oil, or both), noncolloidal solids (sand, iron ore, barite, hematite), colloidal solids (clays, organic colloids), and dissolved chemicals (mineral lignin, barium carbonate, sodium bicarbonate, formaldehyde, etc.).

The drilling mud must be removed and/or displaced from the wellbore prior to cementing the well casings in a borehole. Contact between cement and the drilling fluid is to be avoided because the two are typically incompatible and often result in detrimental interactions. This incompatibility can contribute to the failure to obtain a satisfactory bond between the cement and the wall of the borehole, between the cement and the casing, and interfere with the cement chemistry. In applications where oil-based drilling fluids are used, the incompatibility often results in contamination, or commingling, of mud with cement, and cement with mud. Extreme viscosities often arise from such commingling, causing excessive pressures and pumping problems. In some cases this leads to undesirable formation breakdown. When a portion of the drilling fluid is commingled with cement, premature setting of the cement can occur and conversely, when drilling fluids are contaminated with cement, the properties advantageously characteristic of drilling fluids are adversely affected. The problem of commingling can be overcome by separating the cement and the drilling fluid by what is called a "spacer" fluid. Spacer fluids clean the borehole to such a degree as to provide good bonding between the cement and the casing and the borehole wall.

The liquid phase of the drilling mud tends to flow from the well into exposed permeable formations with the result that mud solids are filtered out on the wall of the borehole thereby forming a filter cake of mud-like material thereon. This mud-like material is a barrier to proper bonding of cement. It is therefore necessary to remove this filter cake and other drilling mud residues from the borehole wall prior to cementing. Once removed, a cement slurry is employed to permit the formation of a solid layer of hardened, cured and bonded cement between the casing and the geologic formation through which the borehole passes. The spacer systems of the present invention will leave the borehole wall and the casing clean of residual mud and filter cake and provide the wall surfaces with enhanced water wet properties thereby enhancing the bonding of the cement to the casing and the borehole wall.

Any oil and/or gas borehole can be cleaned in accordance with the present invention regardless of their angle or deviation from vertical to horizontal. Cleaning the wellbore, or a section of the well hole, containing a casing, in accordance with the present invention will result in the desired zonal isolation, good cement-to-casing bonding and good cement-to-wall bonding. Thus any remedial cement squeeze operations will be unnecessary.

The spacer fluid of the present invention comprises at least one alkyl ether citrate. The alkyl ether citrates employable in the context of the present invention include, but are not limited to alkyl ether citrates of general formulae I, II and/or III:

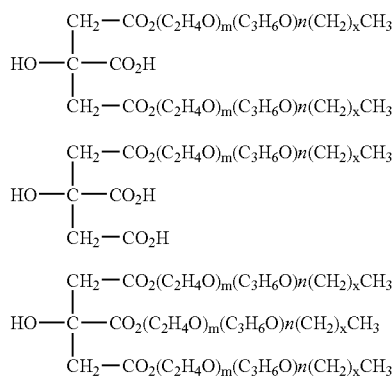

wherein x is 1-20, in another embodiment 5-15; m is 1-50, in another embodiment 3-10; n is in another embodiment 0-2.

Specific examples of alkyl ether citrates suitable for use in the present invention include, but are not limited to, heptylether citrate ethoxylates, octylether citrate ethoxylates, nonylether citrate ethoxylates, decylether citrate ethoxylates, hendecylether citrate ethoxylates, docylether citrate ethoxylates, tridecylether citrate ethoxylates, tetradecylether citrate ethoxylates, mixtures thereof, and the like.

In another embodiment, the alkyl ether citrate is octylether citrate ethoxylates, nonylether citrate ethoxylates, decylether citrate ethoxylates, hendecylether citrate ethoxylates, docylether citrate ethoxylates, tridecylether citrate ethoxylates, or a mixture thereof.

Said at least one alkyl ether citrate is typically employed in said spacer fluid in a concentration of from about 0.5% by weight to about 10% by weight based on 100% active; in another embodiment from about 0.8% by weight to about 5% by weight based on 100% active; and in still another embodiment, from about 1 to about 3% by weight, based on 100% active. A typical spacer fluid formulation contains 4 wt % of a 40% solution of alkyl ether citrate.

In a second embodiment, the invention relates to a spacer fluid that comprises a combination of at least one alkyl ether citrate and at least one non-ionic surfactant that is preferably "green" for environmental compatability. Examples of suitable nonionic surfactants include, but are not limited to ethoxylated and/or propoxylated primary linear $C_4$ to $C_{20+}$ alcohols.

The alcohol ethoxylate employable in the context of the present invention is represented by general formula IV:

$$CH_3(CH_2)x(C_2H_4O)m(C_3H_6O)nOH \qquad IV$$

wherein x is 1-20, in another embodiment 5-15; m is 1-50, in another embodiment 3-10; and n is 0-10, in another embodiment 0-3.

Suitable alcohol ethoxylates for use in the present invention include, but are not limited to linear or branched heptyl alcohol ethoxylates, octyl alcohol ethoxylates, nonyl alcohol ethoxylates, decyl alcohol ethoxylates, hendecyl alcohol ethoxylates, docyl alcohol ethoxylates, tridecyl alcohol ethoxylates, tetra alcohol ethoxylates, mixtures thereof, and the like.

In another embodiment, suitable alcohol ethoxylates for use in the present invention include, but are not limited to, linear or branched octyl alcohol ethoxylates, nonyl alcohol ethoxylates, decyl alcohol ethoxylates, hendecyl alcohol ethoxylates, docyl alcohol ethoxylates, tridecyl alcohol ethoxylates, mixtures thereof, and the like.

The weight ratio of alkyl ether citrate to alcohol ethoxylate is generally in the range of from about 0.1-50. In another embodiment said ratio is in the range of from about 0.5-25, and in still another embodiment from about 0.5-5.

The combination of said at least one alkyl ether citrate/alcohol alkoxylate is typically employed in the spacer fluid of the invention at a concentration of from about 0.5% by weight to about 10% by weight based on 100% active; in another embodiment from about 1.0% by weight to about 5% by weight based on 100% active; and in still another embodiment, from about 1.5 to about 3% by weight, based on 100% active.

The spacer of the present invention can also include a variety of optional ingredients including, but not limited to, weighting agents, solvents, viscosifying agents, lost circulation control agents, and other materials known in the art to impart the desired characteristics to the spacer, provided they do not render the spacer incompatible with the mud or the cement and they do not interfere with the desired turbulent flow of the spacers. Minor amounts of an antifoaming agent may also be included to provide better mixing properties. Additionally, where the formation is sensitive to fresh water, such as certain shales or clay containing sandstone, a salt such as an alkali metal halide may be incorporated in the spacer.

The present invention relates to both an aqueous and a non-aqueous spacer system for cleaning the section of a well borehole in which a casing is to be cemented. The aqueous system is preferred for obvious environmental reasons.

Depending on the particular well and mud being displaced, one or more pre-flushes compatible with the mud and cement slurry can be used to prevent incompatibilities between the mud and the cement slurry. Also the composition of each wash or spacer may vary depending on the oil/gas bearing formation.

The spacer system of the present invention can also optionally include one or more weighting agents to, for example, adjust the density of the spacer. It is generally accepted that the density of the spacer be higher than the density of the drilling mud and lower than the density of the cement slurry. The buoyancy effect assists in the removal of the mud.

Weighting materials suitable for use with this third spacer are any of those conventionally known and used in the drilling industry. Solids suitable for use herein as weighting agents are those which are conventionally used in the drilling industry and which are substantially water and liquid hydrocarbon insoluble. Non-limiting examples of such solids include bentonite, diatomaceous earth, barite, hematite or other iron oxides, fly ash, other finely ground solids, and the like. The weighting agents can also serve as scrubbing agents. The weighting agent is used in an amount sufficient to provide the desired composition density. The particle size of the solids used herein are any size which is conventionally used for drilling fluids and spacers. It is preferred that the particles be extremely fine and in the range of from about 0.05 to 5 microns, averaging about 0.5 microns. Fly ash particles, on the other hand, are on the order of about 100 times greater than that of bentonite, or about 0.5 to 200 microns, averaging about 50 microns. The particle size of the weighting agent can vary greatly depending on the intended objective of the spacer.

Solvents can also be used in the spacer systems of the invention, but the trend is to use less of them due to environmental issues. Non-limiting examples of solvents which can be used include: glycols, such as propylene glycol, ethylene glycol, hexylene glycol, dipropylene glycol, diethylene glycol, tripropylene glycol, and triethylene glycol; poly glycols; ethers, such as monomethyl ether; glycol ethers; alkanes and cyclic alkanes, such as pentane, hexane, and cyclohexane, heptane; mineral oils, such as seal oil; plant oils, such as the terpenes (which are preferred); esters; aromatics, such as benzene, toluene, xylene, and ethyl benzene; ketones, such as acetone, methyl ethyl ketone, methyl propyl ketone, methyl isobutyl ketone, methyl isoamyl ketone, diacetone alcohol, methyl amyl ketone, cyclohexanone, diisobutyl ketone, and isophorone; chlorinated solvents, such as methylene chloride; chloroform, 1,1,1-trichlorethane, ethylene dichloride, trichlorethylene, propylene dichloride, perchlorethylene, monochlorobenzene, and orthodichlorobenzene; amines, such as isopropyl amine, ethyl amine, diethyl amine, butyl amine, diisopropyl amine, triethyl amine, morpholine, cyclohexylamine, dimethylethanoamine, dibutyl amine, tetraethylene pentamine, momoisopropanolamine, diethylethanoamine, monoethanolamine, diethanolamine, diisopropanolamine; alcohols, such as methanol, ethanol, isopropanol, n-propanol, isobutanol, n-butanol, amyl alcohol, methyl amyl alcohol, cyclohexanol, and 2-ethylhexanol; and petroleum naphthas.

The spacer of the invention can also be viscosified with, for example, a polymeric component if a more viscous composition is required. Non-limiting examples of polymeric materials suitable for use herein include welan gum (see EP 0243067), xanthan gum, and high molecular weight cellulose derivatives such as carboxymethylcellulose (CMC), hydroxyethylcellulose (HEC), and hydroxypropylcellulose (HPC). Preferred are welan gum and HEC. This spacer may also contain the previously mentioned surfactants.

Both the viscosified and the non-viscosified forms can contain from about 1 to about 20 vol. % of a water based surfactant. Dispersant surfactants are usually used to clean water based muds, such as polynaphthalene sulfonates (see U.S. Pat. No. 3,878,895 which is incorporated herein by reference), lignosulfonates and tannates. When cleaning an oil-based mud, the surfactants must clean the oil and leave the formation and casing water wet. These surfactants are usually a combination of non-ionic and anionic surfactants, such as ethoxylated nonylphenols, fatty acid esters and ethoxylated fatty alcohols (see U.S. Pat. No. 1,185,777 which is incorporated herein by reference). Examples of anionic surfactants are alkyl sulfonates, alkyl aryl sulfonates, sulfonated ethoxylated fatty alcohols and the like (see U.S. Pat. No. 4,588,032 which is incorporated herein by reference).

The spacer of the invention can be viscosified, and it can also be weighted from about 8 to 20 pounds per gallon. Weighting materials suitable for use with this spacer are any of those conventionally used in the drilling industry, and which non-limiting list was set forth previously herein. The volume of this spacer will be from about 1 to 200%, preferably from about 1 to 100% of annular volume between the borehole wall and the casing. The water used for this spacer fluid composition can be salt water or fresh water.

The spacers of the present invention are contacted with the well bore for a time effective to impart the desired level of cleaning, i.e., for a time which is effective to remove substantially all of the residual mud residue and mud cake from the borehole. This amount of time will typically be from about 1 to 60 minutes depending on the circumstances.

In the embodiments of the present invention, a diluent oil is optionally first pumped down the borehole to dilute the drilling fluid (in case of an oil-based mud) and to initiate displacement of the drilling fluid. A diluent oil is typically an organic liquid, preferably an oil, which is substantially the same as, or is compatible with, the oil which is used as the base for the drilling fluid in the borehole requiring treatment. Non-limiting examples of diluent oils include the base-oil of the drilling mud of the borehole being serviced, as well as crude oils, distillate oils, gasolines, naphthas, kerosenes, fuel oils, white oils, oils derived from coal or shale, aromatic oils, silicone oils, mineral seal oils, and paraffinic solvents. Also suitable as a diluent are vegetable oils which include babassu oil, castor oil, coconut oil, corn oil, cottonseed oil, hemp oil, linseed oil, oiticica oil, olive oil, palm oil, peanut oil, rape oil, safflower, sesame oil, soybean, sunflower, and tung oil, and synthetic oils. Also suitable are the terpenes, preferably limonene and terpinol. Other terpene related derivatives composed of carbon, hydrogen, and oxygen, and having 10 carbon atoms with 0, 1 or 2 hydroxyl groups, and 0, 1 or 2 double bonds, may be used in alternate embodiments. The hydroxyl group helps break the hydrogen bonding of sludge to metal surfaces. The terpene alcohols are effective in dispersion or emulsion systems. Synthetic oils are a preferred class of compounds for use as the diluent oil, especially esters, diethers, olefins, and detergent alkylate, as well as mixtures thereof. Synthetic oils also include hydrocarbon oils and halo-substituted hydrocarbon oils such as polymerized and interpolymerized olefins, for example polybutylenes, polypropylenes, propylene-isobutylene copolymers, chlorinated polybutylenes, poly(1-hexenes), poly(1-octenes), poly(1-decenes); alkylbenzenes, such as dodecylbenzenes, tetradecylbenzenes, dinonylbenzenes, di- (2-ethythexyl)benzenes; polyphenyls such as biphenyls, terphenyls, and alkylated polyphenyls; and alkylated diphenyl ethers and alkylated diphenyl sulfides and derivatives, analogs and homologs thereof.

After the drilling fluid has been displaced and the borehole wall and casing cleaned in accordance with the present invention, the casing can be cemented to the bore walls by conventional means.

The invention also relates to a method for cleaning a section of a well borehole prior to a cementing operation, said borehole having a casing suspended therein, and containing therein an oil or synthetic-based drilling fluid. The method comprises:

a) optionally displacing drilling fluid from the section of said borehole to be cemented, with a composition that comprises water, an effective amount of solid particles for weighting, from about 1 to 20 vol. % of a surfactant, and optionally a viscosifying agent, b) pumping into said borehole the spacer fluid of the present invention, optionally under turbulent or laminar flow conditions, in an amount to effectively remove and displace substantially all of any remaining drilling fluid residue and to displace said first spacer fluid from the cleaned section of the borehole; and c) optionally, pumping into said borehole a third fluid which is a water-based composition comprised of an aqueous solution of a surfactant component, wherein the amount of surfactant is about 1 to 20 vol. %, based on the total volume of said spacer fluid, and wherein said third fluid is used in an amount that will effectively displace substantially all of said second spacer fluid and leave at least the cleaned section of said borehole substantially water wet.

Alternatively, the displacing drilling fluid of step a) is a weighted solvent, which solvent is an effective solvent with respect to drilling fluid residue in the borehole.

Finally, after cleaning the wellbore to the desired degree, cement is pumped into the borehole in such an amount to displace any remaining spacer fluid and to fill the cleaned annular space defined by the casing tubular and the borehole wall.

The invention will now be illustrated by the following nonlimiting examples.

Typical Cement Spacer/Wash Fluid Formulation:
  3% wt. of 40% aqueous Alkylether Citrate solution (AEC-40)
  1% wt. Ethoxylated Alcohol
  96% wt. Tap Water This base formulation is a simplified cement spacer/cement chemical wash formulation designed to evaluate the cleaning efficiency of a surfactant in the laboratory. It can be incorporated with other cement spacer components as described before, such as weighting agents, viscosity modifiers, loss circulation materials, solvents, etc, for final field formulation preparation and application.

In the examples below, two commercial ethoxylated branched alcohols were used, Berol® 840 and GT2624 from Akzo Nobel.

Cleaning Efficiency Test

The cleaning test measures the capability of a surfactant to remove a viscous layer of mud with gentle erosion. A 30 mesh metallic grid is placed over a bottom-sealed R1 cylinder geometry from a Fann 35 viscometer. The sealed R1 cylinder is then weighed and the value is recorded as $W_1$. The grid around the sealed R1 cylinder is covered with test mud and left under static condition for 5 minutes. The sealed R1 cylinder is then weighed and the value is recorded as $W_2$. The sealed R1 cylinder is then submerged in a preheated Cement Spacer surfactant solution. The sealed R1 cylinder is then rotated at a speed of 100 rpm and the weight of the cylinder ($W_i$) is recorded at different times, such as 5, 10, 20, 30, 40, and 60 minutes ($t_i$). The cleaning efficiency % is calculated as:

Cleaning Efficiency %$(t_i)$=$(1-(W_i-W_1)/(W_2-W_1))$ *100

EXAMPLE 1

Cleaning Efficiency of Alkylether Citrate ($C_{10}EO_7$)/Berol 840 Formulation on Synthetic Oil Based Mud (SBM)

EXAMPLE 2

Cleaning Efficiency of Alkylether Citrate ($C_{10}EO_7$) Formulation on Synthetic Oil Based Mud

|  | 20 min | 40 min |
|---|---|---|
| AEC-40 (4% wt.) | 22.4% | 25.1% |
| GT2624 (4% wt.) | 0% | 26% |

EXAMPLE 3

Cleaning Efficiency of Alkylether Citrate ($C_{12-14}EO_8$) Formulation on Field Oil Based Mud

|  | 10 min | 20 min | 30 min | 40 min |
|---|---|---|---|---|
| AEC-40 (4% wt.) | 25.6% | 40.1% | 56.1% | 66.6% |
| GT2624 (4% wt.) | 14.5% | 20.2% | 21.9% | 22.3% |

What is claimed is:

1. A spacer fluid composition for cleaning a section of a well bore prior to cementing which comprises at least one alkyl ether citrate of general formulae I, II and/or III:

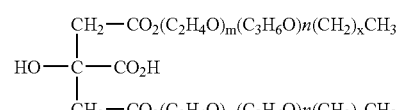

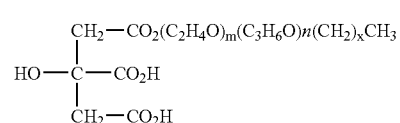

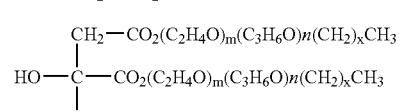

wherein x is 1-20; m is 1-50; and n is 0-10, and optionally at least one alcohol ethoxylate of general formula IV:

$CH_3(CH_2)_x(C_2H_4O)_m(C_3H_6O)_nOH$   IV wherein x is 1-20; m is 1-50; n is 0-10; and said at least one alkyl ether citrate is employed in said spacer fluid at a concentration of from about 1 to about 3% by weight, based on 100% active.

2. The composition of claim 1 additionally comprising at least one optional component selected from weighting agents, solvents, viscosifying agents, lost circulation control agents, and mixtures thereof.

3. The composition of claim 2 wherein the viscosifying agent is welan gum, xanthan gum, a high molecular weight cellulose derivative, or a mixture thereof.

4. The composition of claim 3 wherein said high molecular weight cellulose derivative is carboxymethylcellulose (CMC), hydroxyethylcellulose (HEC), hydroxypropylcellulose (HPC), or mixtures thereof.

5. The composition of claim 1 wherein said alkyl ether citrate is an heptylether citrate ethoxylate, octylether citrate ethoxylate, nonylether citrate ethoxylate, decylether citrate ethoxylate, hendecylether citrate ethoxylate, docylether citrate ethoxylate, tridecylether citrate ethoxylate, tetradecylether citrate ethoxylate, or a mixture thereof.

6. The composition of claim 1 which comprises at least one alcohol ethoxylate of general formula IV wherein the weight ratio of alkyl ether citrate to alcohol ethoxylate is in the range of from about 0.1-50.

7. The composition of claim 6 wherein said alcohol ethoxylate is linear or branched heptyl alcohol ethoxylate, octyl alcohol ethoxylate, nonyl alcohol ethoxylate, decyl alcohol ethoxylate, hendecyl alcohol ethoxylate, docyl alcohol ethoxylate, tridecyl alcohol ethoxylate, tetra alcohol ethoxylate, or a mixture thereof.

8. The composition of claim 7 wherein the weight ratio of alkyl ether citrate to alcohol ethoxylate is in the range of from about 0.5-25.

9. The composition of claim 8 wherein the weight ratio of alkyl ether citrate to alcohol ethoxylate is in the range of from about 0.5-5.

10. The composition of claim 6 wherein said combination of said at least one alkyl ether citrate and said at least one alcohol ethoxylate is employed in the spacer fluid composition at a concentration of from about 0.5% by weight to about 10% by weight based on 100% active.

11. The composition of claim 10 wherein said combination of said at least one alkyl ether citrate and said at least one alcohol ethoxylate—is employed in the spacer fluid composition at a concentration of from about 1.5 to about 3% by weight, based on 100% active.

12. A method for cleaning a section of a well bore prior to a cementing operation, said well bore having a casing suspended therein, said method comprising:
 a) optionally displacing drilling fluid from the section of said borehole to be cemented, with a composition that comprises water, an effective amount of solid particles for weighting, and from about 1 to 20 vol. % of a surfactant;
 b) pumping into said borehole the spacer fluid of claim 1, under turbulent flow conditions, in an amount to effective to remove and displace substantially all of any remaining drilling fluid residue and to displace said optional first spacer fluid from the cleaned section of the borehole; and
 c) optionally, pumping into said borehole a third fluid which is a water-based composition comprised of an aqueous solution of a surfactant component, wherein the amount of surfactant is about 1 to 20 vol. %, based on the total volume of said spacer fluid, and wherein said third fluid is used in an amount that will effectively displace substantially all of said second spacer fluid and leave at least the cleaned section of said borehole substantially water wet.

13. The method of claim 12 wherein said alkyl ether citrate of said spacer fluid is an heptylether citrate ethoxylate, octylether citrate ethoxylate, nonylether citrate ethoxylate, decylether citrate ethoxylate, hendecylether citrate ethoxylate, docylether citrate ethoxylate, tridecylether citrate ethoxylate, tetradecylether citrate ethoxylate, or a mixture thereof.

14. The method of claim 12 wherein said spacer fluid further comprises at least one alcohol ethoxylate which is a linear or branched heptyl alcohol ethoxylate, octyl alcohol ethoxylate, nonyl alcohol ethoxylate, decyl alcohol ethoxylate, hendecyl alcohol ethoxylate, docyl alcohol ethoxylate, tridecyl alcohol ethoxylate, tetra alcohol ethoxylate, or a mixture thereof.

15. The method of claim 14 wherein said spacer fluid comprises a combination of said at least one alkyl ether citrate and said at least one alcohol ethoxylate, and wherein said combination is employed in the spacer fluid composition at a concentration of from about 1.0% by weight to about 5% by weight based on 100% active.

\* \* \* \* \*